(12) United States Patent
Honda

(10) Patent No.: US 8,583,858 B2
(45) Date of Patent: Nov. 12, 2013

(54) NONVOLATILE MEMORY CONTROLLER AND NONVOLATILE STORAGE DEVICE

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 132 days.

(21) Appl. No.: 13/038,772

(22) Filed: Mar. 2, 2011

(65) Prior Publication Data

US 2011/0238895 A1 Sep. 29, 2011

(30) Foreign Application Priority Data

Mar. 25, 2010 (JP) ................................. 2010-069602

(51) Int. Cl.
*G06F 12/00* (2006.01)
*G06F 13/00* (2006.01)
*G06F 13/28* (2006.01)

(52) U.S. Cl.
USPC ............ 711/103; 711/156; 711/165; 711/170

(58) Field of Classification Search
USPC .................. 711/103, 156, 165, 170
See application file for complete search history.

(56) References Cited

U.S. PATENT DOCUMENTS

| 5,841,699 | A * | 11/1998 | Miyauchi ................. | 365/185.33 |
| 2002/0051394 | A1 * | 5/2002 | Tobita et al. .................. | 365/221 |
| 2006/0288153 | A1 * | 12/2006 | Tanaka et al. ................. | 711/103 |
| 2007/0050536 | A1 * | 3/2007 | Kolokowsky ................. | 711/103 |
| 2008/0215800 | A1 * | 9/2008 | Lee et al. ...................... | 711/103 |
| 2008/0239811 | A1 | 10/2008 | Tanaka | |
| 2008/0256287 | A1 * | 10/2008 | Lee et al. ...................... | 711/103 |
| 2008/0282025 | A1 * | 11/2008 | Biswas et al. ................. | 711/103 |
| 2010/0042772 | A1 * | 2/2010 | Bonella et al. ................ | 711/103 |
| 2010/0070692 | A1 * | 3/2010 | Litsyn et al. .................. | 711/103 |
| 2011/0010491 | A1 * | 1/2011 | Anderson ..................... | 711/103 |

FOREIGN PATENT DOCUMENTS

| JP | 2008-257773 | 10/2008 |
| JP | 2009-48680 | 3/2009 |

* cited by examiner

*Primary Examiner* — Ryan Bertram
(74) *Attorney, Agent, or Firm* — Wenderoth, Lind & Ponack, L.L.P.

(57) ABSTRACT

A flash memory unit includes a plurality of physical blocks including a plurality of memory cells and serving as erase units of data, wherein each of the memory cells is capable of recording information of 1 bit or more and degradation in the characteristics of the memory cells differs according to the amount of information that is recorded. A controller includes a control unit for controlling the reading, writing and erasure of data to and from the flash memory unit, and a degradation level table for recording a degradation level of the memory cells in physical block units. The control unit stores, in the degradation level table, the degradation level of the memory cells according to the amount of information stored in the memory cells for each cycle of data erasure from the physical blocks.

10 Claims, 8 Drawing Sheets

| | | AREA DEFINITION TABLE | DEGRADATION LEVEL TABLE | ADDRESS CONVERSION TABLE | INVALID BLOCK TABLE |
|---|---|---|---|---|---|
| 601 | DETERMINE WRITE DESTINATION PHYSICAL BLOCK | — | R | — | R |
| 602 | UPDATE DEGRADATION LEVEL TABLE | R | W | — | — |
| 603 | WRITE DATA FROM HOST DEVICE | R | — | (R) | — |
| 604 | UPDATE ADDRESS CONVERSION TABLE/ INVALID BLOCK TABLE | — | — | R/W | W |

| PHYSICAL BLOCK ADDRESS | DEGRADATION LEVEL |
|---|---|
| 0000h | 0000 0001h |
| 0001h | 0000 0100h |
| ⋮ | ⋮ |
| 1FFFh | 0000 0011h |

FIG. 8

| LOGICAL BLOCK ADDRESS | PHYSICAL BLOCK ADDRESS |
|---|---|
| 0000h | 0000h |
| 0001h | 1FFFh |
| ⋮ | ⋮ |
| 1F39h | 1000h |

FIG. 9

| PHYSICAL BLOCK ADDRESS |
|---|
| 0010h |
| 0123h |
| 0456h |
| ⋮ |
| 2000h |
| ⋮ |

FIG. 10

| | AREA DEFINITION TABLE | DEGRADATION LEVEL TABLE | ADDRESS CONVERSION TABLE | INVALID BLOCK TABLE |
|---|---|---|---|---|
| DETERMINE WRITE DESTINATION PHYSICAL BLOCK | — | R | — | R |
| UPDATE DEGRADATION LEVEL TABLE | R | W | — | — |
| WRITE DATA FROM HOST DEVICE | R | — | (R) | — |
| UPDATE ADDRESS CONVERSION TABLE/ INVALID BLOCK TABLE | — | — | R/W | W |

601
602
603
604

NONVOLATILE MEMORY CONTROLLER AND NONVOLATILE STORAGE DEVICE

BACKGROUND OF THE INVENTION

1. Field of the Invention

The present invention relates to a nonvolatile memory controller for controlling a nonvolatile memory such as a flash memory, and to a nonvolatile storage device using such nonvolatile memory controller.

2. Description of the Related Art

In recent years, as a nonvolatile storage device equipped with a NAND-type flash memory as a rewritable nonvolatile memory, memory cards are being used as the storage medium of digital cameras and mobile phones, and its market is expanding.

Moreover, pursuant to the microfabrication of the semiconductor process, the bit unit price of nonvolatile storage devices has decreased and nonvolatile storage devices are being used as an inexpensive storage device in markets other than memory cards; for example, as memories of SSD (Solid State Drive) used as a substitute of HDD (Hard Disk Drive) or of embedded systems which are directly mounted on a host device, and its application is expanding.

Here, the characteristics of a NAND-type flash memory can be listed as follows:

A nonvolatile memory with the largest capacity among the semiconductor memories and with a low bit cost The reliability of data is deterioration pursuant to the microfabrication of the semiconductor process There are a plurality of types of memory cells including binary and multi-valued Each of these characteristics is now explained in order.

With a NAND-type flash memory, if the minimum feature size of the semiconductor process is F, then one memory cell can be configured in a size of the square of (2F). This is why the NAND-type flash memory has the lowest bit cost and largest capacity among the semiconductor memories.

Moreover, in recent years, a NAND-type flash memory is being manufactured by using, as the process driver, the most advanced process rule of the semiconductor process. Consequently, a NAND-type flash memory is now being used in systems that use different memories.

For example, a system in which a program code demanded of high-speed random access is stored in a NOR-type flash memory and user data demanded of large capacity is stored in a NAND-type flash memory is being replaced only with a single NAND-type flash memory.

This is because the capacity of the mounted NAND-type flash memory is sufficiently smaller than the capacity of the required NOR-type flash memory and, even if the program code loaded in the NOR-type flash memory is stored in the NAND-type flash memory, the influence is minimal, and the cost advantages of being able to eliminate the NOR-type flash memory are higher even if it is necessary to apply creative efforts in using the NAND-type flash memory.

Moreover, the increase in capacity of the NAND-type flash memory depends largely on the microfabrication of the semiconductor process. Nevertheless, the microfabrication of the semiconductor process is not only advantageous, it also entails the problem of deteriorating the reliability of data. Specifically, pursuant to the advancement of microfabrication, the data retention characteristics will deteriorate, and degradation of characteristics due to the rewrite processing will advance.

Here, a memory cell of the flash memory takes on a configuration of retaining, in a nonvolatile manner, electrons between a control gate and a substrate in a MOS (Metal Oxide Semiconductor)-type transistor, and performs the erasure and writing of data by shifting the electrons between the substrate and the floating gate. Moreover, data is read from the memory cell of the flash memory by determining the amount of current that flows through the transistor configuring the flash memory.

As described above, when the erasure and writing of data are repeated to the memory cells of the flash memory, the electrons move between the substrate and the floating gate, and this causes the degradation of the insulator film (hereinafter referred to as the "gate insulator film") between the substrate and the floating gate. When the gate insulator film becomes degraded, electrons are leaked from the floating gate to the substrate via the defects existing in the gate insulator film, the writing efficiency deteriorates due to the influence of the electrons trapped in the defects of the gate insulator film, and this consequently deteriorates the reliability of data.

Even with the foregoing disadvantages, with the unparalleled bit unit price as its strength, the use of flash memories manufactured based on microfabrication is expanding even if it is necessary to apply creative efforts for improving the reliability of data.

Moreover, an important element upon examining the reliability of data of a flash memory is the handling of memory cells in the writing of data. Specifically, the reliability of data differs considerably depending on whether data is written as a binary memory cell or data is written as a multi-valued memory cell, and the reliability of data is higher if data is written as a binary memory cell. Meanwhile, needless to say, the capacity of the memory can be increased if data is written as a multi-valued memory cell, and the bit unit price can be reduced at the same time.

From the foregoing characteristics of a NAND-type flash memory, there are cases of using a plurality of different writing methods upon storing data in the flash memory. For example, it is possible to perform binary writing upon writing a program code demanded of high reliability as a binary memory cell, and perform multi-valued writing upon writing user data demanded of high capacity as a multi-valued memory cell.

The binary writing and the multi-valued writing are now compared. In order to simply the explanation, the case of performing binary writing and the case of performing four-valued writing are now explained with reference to the drawings.

FIG. 12 is a diagram showing how the threshold voltage of the memory cells is distributed in the case of binary writing. The distribution on the left side of FIG. 12 shows the distribution of the threshold voltage of the memory cells in an erased state, and the distribution on the right side of FIG. 12 shows the distribution of the threshold voltage of the memory cells in a written state. In the case of binary writing, 1 bit of information is stored depending on whether the threshold voltage of the memory cell is on the left-side distribution or the right-side distribution.

FIG. 13 is a diagram showing how the threshold voltage of the memory cells is distributed in the case of four-valued writing. The distribution on the left side of FIG. 13 shows the distribution of the threshold voltage of the memory cells in an erased state, and the three distributions on the right side of FIG. 13 respectively show the distribution of the threshold voltage of the memory cells in respectively different written states. In the case of four-valued writing, 2 bit information is stored depending on where the threshold voltage of the memory cells is located among the four distributions.

As evident from FIG. 12 and FIG. 13, the distribution interval 1301 of the threshold voltage in the case of four-valued writing is narrower in comparison to the distribution interval 1201 of the threshold voltage in the case of binary writing. Accordingly, as the distribution interval becomes narrow, the margin relative to the variation in the threshold voltage of the memory cells becomes small. In other words, the data retention period is shorter with the four-valued writing in comparison to the binary writing.

Moreover, the distribution width 1302 of the threshold voltage in the case of four-valued writing needs to be narrower in comparison to the distribution width 1202 of the threshold voltage in the case of binary writing. Accordingly, in order to narrow the distribution of the threshold voltage of the memory cells, it is necessary to repeatedly execute detailed control in the writing to the memory cells. Consequently, degradation of the gate insulator film during the rewriting process will advance as a result of the number of times that writing stress is applied to the memory cells increasing, or the application period becoming longer, and the rewrite cycle will decrease.

FIG. 14 is a diagram showing how the threshold voltage of the memory cells is distributed in the case of eight-valued writing. In the case of eight-valued writing, it is evident that the distribution interval 1401 of the threshold voltage and the distribution voltage 1402 of the threshold voltage are respectively even narrower in comparison to the case of four-valued writing. In other words, if the eight-valued writing is performed, the rewrite cycle will decrease further, and the data retention period will be shortened further.

Moreover, Japanese Patent Application Publication No. 2008-257773 describes technology related to a nonvolatile storage device with a binary writing area and a multi-valued writing area, wherein, by physically dividing and managing a memory cell array into an area to use as the binary writing area and an area for use as the sixteen-valued (i.e., multi-valued) writing area, optimal block management in the respective areas is performed.

Nevertheless, with the configuration described in foregoing Japanese Patent Application Publication No. 2008-257773, since the area used as the binary writing area and the area used as the sixteen-valued writing area are physically divided and managed, if only the binary writing area is repeated used, while the rewrite cycle of the physical blocks of the binary writing area will increase and become degraded, the physical blocks of the multi-valued writing area will not degrade since they are not used, and, consequently, there is a problem in that the overall physical blocks cannot be used uniformly.

Moreover, the degradation level of the respective areas is managed only based on the rewrite cycle. Thus, since only a common degradation scale is available for both binary writing and sixteen-valued writing which have different degradation levels to begin with, this becomes a factor in inhibiting the mutual exploitation of the respective areas.

SUMMARY OF THE INVENTION

Thus, an object of this invention is to provide a nonvolatile memory controller and a nonvolatile storage device capable of arbitrarily providing a binary writing area and a multi-valued writing area, and effectively using all blocks of the nonvolatile memory without requiring any physical regional control of the respective areas.

The nonvolatile memory controller according to one aspect of the present invention is a nonvolatile memory controller for controlling a nonvolatile memory, wherein the nonvolatile memory includes a plurality of blocks, each of the blocks includes a plurality of memory cells and is an erase unit of data in the nonvolatile memory, the memory cells can respectively record N bit of information (wherein N is an integer of 1 or more), degradation in characteristics of the memory cells differs according to an amount of information that is recorded, and wherein the nonvolatile memory controller includes a control unit for controlling reading, writing and erasure of data to and from the nonvolatile memory, and a stress table for recording a degradation level of the memory cells in the block units, and wherein the control unit records, in the stress table, the degradation level of the memory cells according to the amount of information stored in the memory cells for each cycle of data erasure from the blocks.

According to the foregoing configuration, it is possible to provide a nonvolatile memory controller and a nonvolatile storage device capable of arbitrarily providing a binary writing area and a multi-valued writing area, and effectively using all blocks of the nonvolatile memory without requiring any physical regional control of the respective areas.

These and other objects, features and advantages of the present invention will become more apparent upon reading the following detailed description along with the accompanying drawings.

BRIEF DESCRIPTION OF THE DRAWINGS

FIG. 8 is a diagram showing an example of the state of the updated address conversion table of the memory depicted in FIG. 1;

FIG. 9 is a diagram showing an example of the state of the updated invalid block table of the memory card depicted in FIG. 1;

FIG. 10 is a diagram showing the referral/non-referral and update/non-update of the respective tables of the respective processes of the write processing of the memory card depicted in FIG. 1;

DETAILED DESCRIPTION OF THE INVENTION

Figure 1:
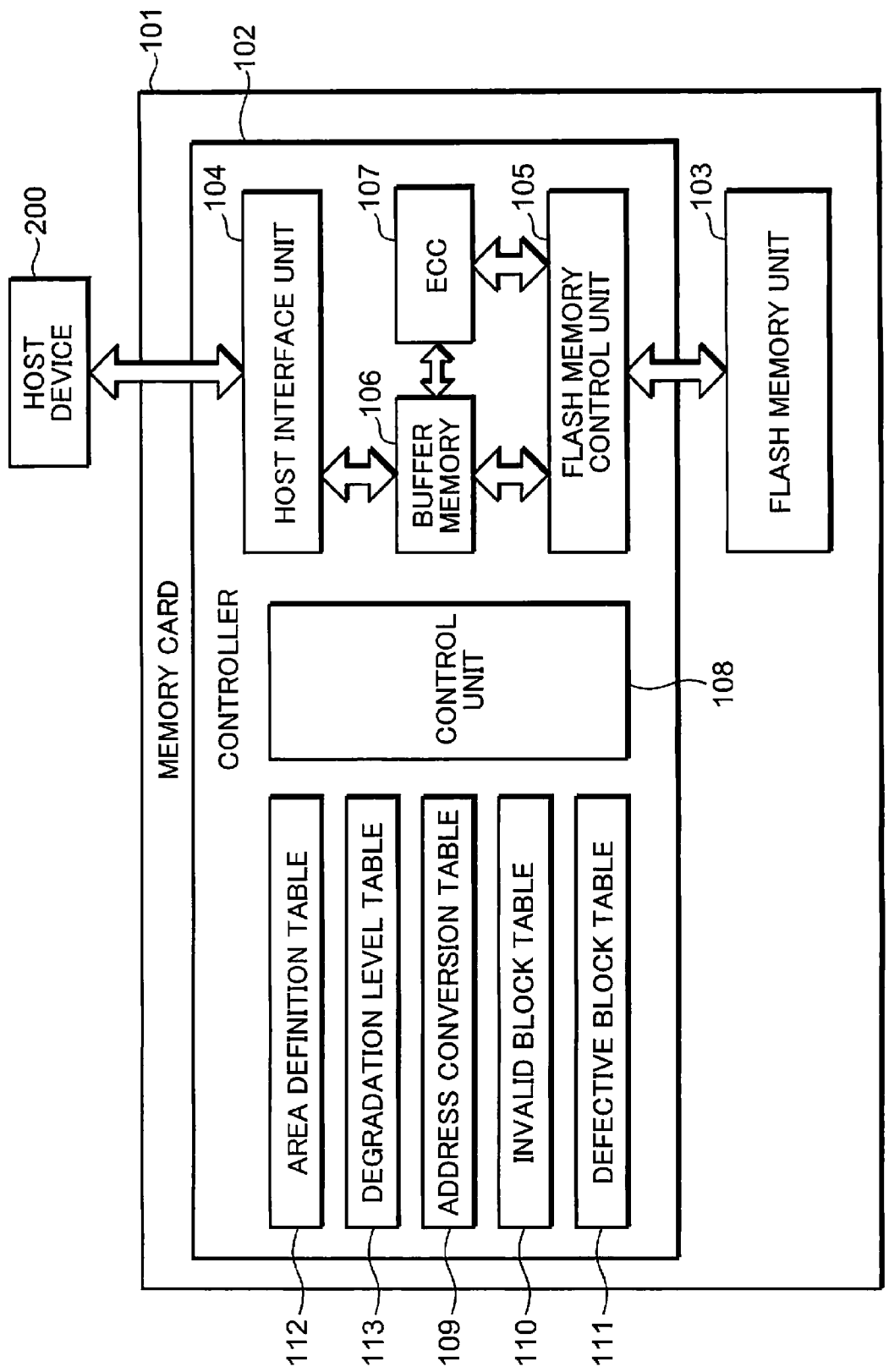
FIG. 1 is a diagram showing the configuration of a memory card according to an embodiment of the present invention.

A memory card according to an embodiment of the present invention is now explained with reference to the attached drawings. FIG. 1 is a block diagram showing the configuration of the memory card according to an embodiment of the present invention.

1. Configuration of Memory Card

The memory card 101 performs the reading and/or writing of data according to commands from an external host device 200 by being connected to the host device 200 and bi-directionally communicating with the host device 200.

The memory card 101 comprises a controller 102 and a flash memory unit 103. The controller 102 controls the interface of the memory card 101 and the host device 200, and also controls the flash memory unit 103.

The flash memory unit 103 is configured from a flash memory as one type of nonvolatile memory. Although not shown, the flash memory is a NAND-type flash memory, and is configured from a plurality of physical blocks. A physical block is configured from a plurality of memory cells. A physical block is a data erase unit in the flash memory. The respective memory cells are able to record N bit of information (wherein N is an integer of 1 or more), and the degradation in the characteristics of the memory cells differs according to the amount of information that is recorded.

Here, the memory card 101 is an example of a nonvolatile storage device, the controller 102 is an example of a nonvolatile memory controller, and the flash memory unit 103 is an example of a nonvolatile memory. Moreover, as examples of the host device 200, there are, for example, a digital camera, a mobile phone, a video recorder, a computer and the like.

The memory card 101 writes data into the flash memory unit 103 or reads data from the flash memory unit 103 according to the writing or reading control of data, for which an address has been designated, from the external host device 200 of the memory card 101.

The controller 102 comprises a host interface unit 104, a flash memory control unit 105, a buffer memory 106, an ECC 107, a control unit 108, an address conversion table 109, an invalid block table 110, a defective block table 111, an area definition table 112, and a degradation level table 113.

The host interface unit 104 controls the interface with the host device 200. The flash memory control unit 105 controls the flash memory unit 103. The buffer memory 106 is a volatile buffer memory for temporarily storing data upon transferring, to and from the flash memory unit 103, write data from the host device 200 or read data to the host device 200.

The ECC 107 is an ECC (Error Checking and Correction) circuit which creates an ECC (Error Correcting Code) to be added upon writing data into the flash memory unit 103, and corrects the read data upon reading data from the flash memory unit 103.

The control unit 108 is connected to the respective blocks via wiring not shown, and performs the internal control of the overall controller 102 by controlling the operation of the respective blocks. Moreover, the control unit 108 performs the control of reading, writing and erasure of data to and from the flash memory unit 103.

The address conversion table 109 stores the correspondence of the address (logical address) designated by the host device 200, and the address (physical address) of the physical blocks of the flash memory unit 103. Specifically, the address conversion table 109 stores, with the address designated from outside of the controller 102 as a logical address and the address of the physical block of the flash memory unit 103 as a physical address, the correspondence information of the logical address and the physical address.

The invalid block table 110 stores a list of addresses of physical blocks in which valid data is not written in the flash memory unit 103 and which are not defective blocks (not managed by the defective block table 111). Specifically, the invalid block table 110 stores the physical address of physical blocks that do not store data corresponding to the logical address and to which the writing of new data can be performed, and physical blocks which can be used for writing data are registered in the invalid block table 110.

The defective block table 111 stores a list of physical addresses of defective blocks in the flash memory unit 103.

The logical address designated by the host device 200 is divided into a plurality of areas and the area definition table 112 is a table which shows the data writing method of data to each of the divided areas. The area definition table 112 is used for determining the amount of information to be recorded in the memory cells of the physical blocks of the flash memory unit 103 correspondingly to the logical address designated by the host device 200, and is configured such that the contents of the table can be rewritten from the outside of the controller 102; for instance, from the host device 200.

Here, as the amount of information that is recorded in the memory cells, there is binary or multi-valued of ternary or more (for example, four-valued, eight-valued, sixteen-valued), and, as the information of the writing type for specifying the writing method, information showing binary writing or information showing multi-valued writing is stored in the area definition table 112 for each arbitrary logical address range.

For example, the area definition table 112 is configured from a volatile memory or a nonvolatile memory which enables the rewriting of data, and, when the host device 200 sends an area definition table rewrite command including the logical address range and information of the writing type for specifying the writing method to be applied to that logical address range to the memory card 101, the control unit 108 stores, in the area definition table 112, the logical address range designated in the area definition table rewrite command and the information of the writing type to be applied to the logical address range.

Note that, when using a plurality of multi-values, information showing the multi-values for each multi-value may be recorded in the area definition table 112; for example, in the case of the four-values, information showing the four-valued writing may be recorded, and, in the case of the eight-values, information showing the eight-valued writing may be recorded.

The degradation level table 113 is a table showing the degradation level of all physical blocks contained in the flash memory unit 103, and is an example of the stress table for recording the degradation level of the memory cells in block units. The control unit 108 records, in the degradation level table 113, the degradation level of the memory cells according to the amount of information stored in the memory cells for each cycle of the erase processing performed on the blocks.

2. Configuration Example of Various Tables

Figure 2:
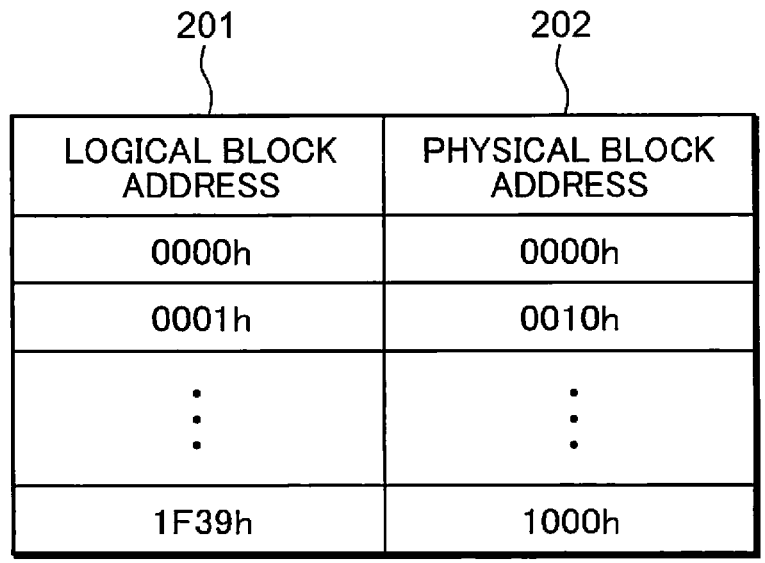
FIG. 2 is a diagram showing an example of the configuration of an address conversion table of the memory card depicted in FIG. 1.

FIG. 2 is a diagram showing an example of the configuration of the address conversion table 109. The address conversion table 109 associates and stores information of the logical block address 201 and information of the physical block address 202. Here, the logical address range is partitioned into logical blocks in units which are equivalent to the capacity of the physical blocks of the flash memory unit 103, and information concerning the logical address for specifying the respective logical blocks is set as the information of the logical block address 201. Meanwhile, information of the physical block address 202 is information of the physical address for specifying the physical blocks. In the address conversion table 109, one record is configured from a pair of one logical block address 201 and the physical block address 202 of the corresponding flash memory unit 103.

For example, data corresponding to the logical block address "0000h" is stored in the physical block of the physical block address "0000h"; that is, the physical block of the address "0000h" in the flash memory unit 103, and data corresponding to the logical block address "0001h" is stored in the physical block of the physical block address "0010h"; that is, the physical block of the address "0010h" in the flash memory unit 103. Moreover, an address for the range from 0000h to 1F39h is managed as the logical block address.

Figure 3:
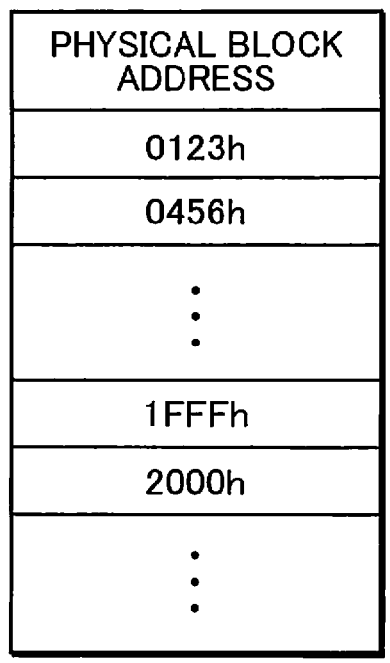
FIG. 3 is a diagram showing an example of the configuration of an invalid block table of the memory card depicted in FIG. 1.

FIG. 3 is a diagram showing an example of the configuration of the invalid block table 110. The invalid block table 110 stores information; for example, 0123h, 0456h, . . . , concerning the physical block address as the address of physical blocks storing invalid data in the flash memory unit 103. Note that the address range of the physical blocks of the flash memory unit 103 is set to the range of 0000h to 1FFFh, and 2000h is treated as an invalid value in the invalid block table 110.

The configuration of the defective block table 111 is the same as the foregoing invalid block table 110, and stores the address of physical blocks of defective data in the flash memory unit 103. Specifically, the defective block table 111 stores information concerning the physical block address of defective blocks, and 2000h is treated as an invalid value.

Figure 4:
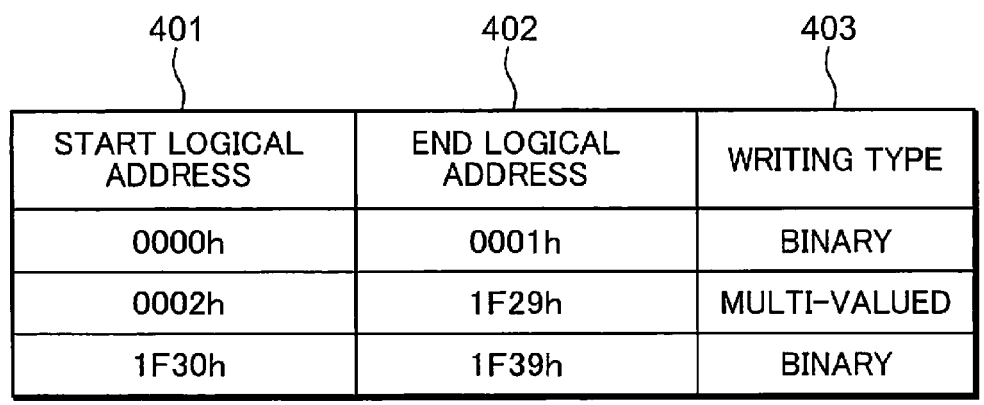
FIG. 4 is a diagram showing an example of the configuration of an area definition table of the memory card depicted in FIG. 1.

FIG. 4 is a diagram showing an example of the configuration of the area definition table 112. In the area definition table 112, a set of information of the start logical address 401, information of the end logical address 402, and information of the writing type 403 is configured as one record. The writing type 403 defines the writing type to the address area from the start logical address 401 to the end logical address 402.

For example, information of the writing type 403 of data corresponding to the logical address from "0000h" of the start logical address 401 to "0001h" of the end logical address 402 is binary writing, and "binary" representing binary writing is stored. The writing type 403 of data corresponding to the logical address from "0002h" of the start logical address 401 to "1F29h" of the end logical address 402 is multi-valued writing, and "multi-valued" representing multi-valued writing is stored. The writing type 403 of data corresponding to the logical address from "1F30h" of the start logical address 401 to "1F39h" of the end logical address 402 is binary writing, and "binary" representing binary writing is stored.

Note that the information of the area definition table 112 is configured so that it can be arbitrarily set by being rewritten from the outside of the memory card 101; for example, from the host device 200. Moreover, the information stored as the writing type 403 is not limited to foregoing examples, and various types of information may be used so as long as it is possible to determine whether the memory card 101 is binary writing or multi-valued writing.

Figure 5:
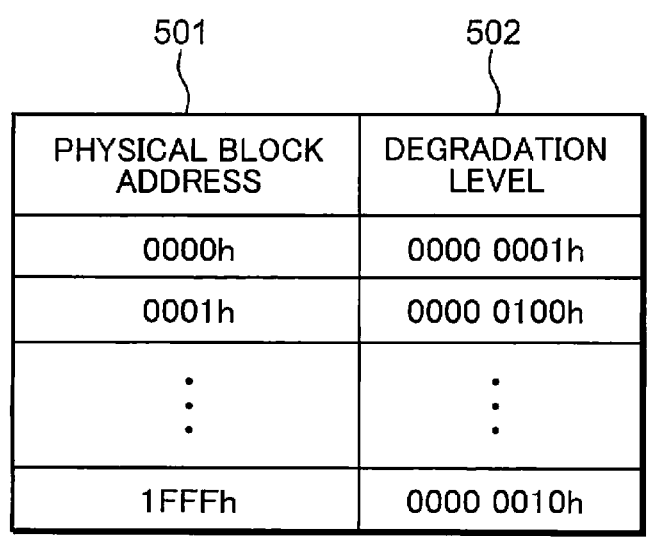
FIG. 5 is a diagram showing an example of the configuration of a degradation level table of the memory card depicted in FIG. 1.

FIG. 5 is a diagram showing an example of the configuration of the degradation level table 113. The degradation level table 113 associates and stores the information of the physical block address 501 and the information of the degradation level 502 representing the degradation level of the memory cells. Here, as the information of the degradation level 502, used may be a value showing the level of degradation of a certain physical block based on the rewrite stress, which is the repetition of the erasing and writing of data, corresponding to all physical blocks of the flash memory unit 103.

For example, as the value of the degradation level 502 for the writing type, with the default value in a state with no degradation as "00000000h", the predetermined amount of stress corresponding to whether that writing is binary writing or multi-valued writing (for example, binary writing is "1" and multi-valued writing is "3") is added to the value of the previous degradation level each time data is rewritten. The value of the degradation level 502 of the physical block "0000h of the writing-type flash memory unit 103 is "00000001h", the value of the degradation level 502 of the physical block "0001h" is "00000100h", and the value of the degradation level 502 of the physical block "1FFFh" is "00000010h".

3. Table Update in Write Processing

Figures 6, 7:
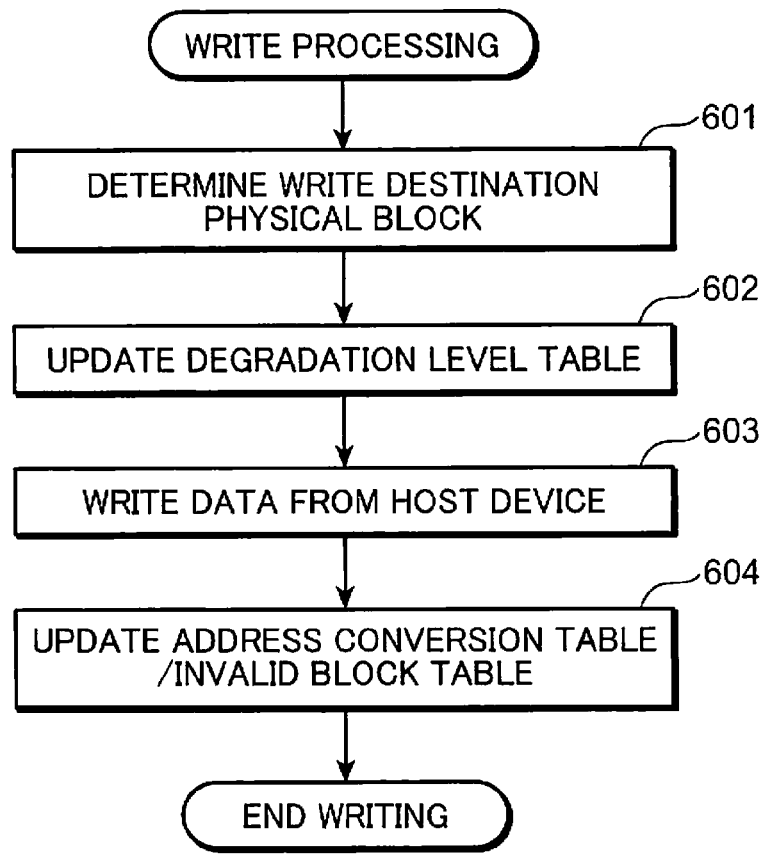
FIG. 6 is a flowchart of the writing processing of the memory card depicted in FIG. 1.
FIG. 7 is a diagram showing an example of the state of the updated degradation level table of the memory card depicted in FIG. 1.

The data write processing in the memory card 101 is now explained for explaining the method of using the area definition table 112 and the degradation level table 113. FIG. 6 is a flowchart of the operation of the control unit 108 in the data write processing of writing data in the memory card 101. The memory card 101 starts the write processing based on a write command from the host device 200 designating the logical address.

The processing 601 is explained first. The control unit 108 determines the write destination physical block, and erases the write destination physical block. Specifically, the control unit 108 refers to the invalid block table 110 and the degradation level table 113, selects the physical block address with the lowest degradation level displayed on the degradation level table 113 among the physical block addresses registered in the invalid block table 110, and determines the physical block of the selected physical block address as the write destination physical block. Subsequently, the control unit 108 issues an erase command to the flash memory unit 103 for designating the physical address of the write destination physical block and erasing the data, and thereby erases the data of the write destination physical block.

In the example shown in FIG. 3 and FIG. 5, among the physical block addresses registered in the invalid block table 110, the physical block address with the lowest degradation level is the physical block address "1FFFh" with a degradation level of "00000010h", and the physical block of the physical block address "1 FFFh" becomes the write destination physical block. Note that, although the physical block of the physical block address "0000h" has a lower degradation level than the physical block address "1 FFFh", since the physical block address "0000h" is not registered in the invalid block table 110, the physical block of the physical block address "0000h" is not an option for selection.

The processing 602 is now explained. The control unit 108 updates the degradation level table 113. Specifically, the control unit 108 refers to the area definition table 112 and determines in which range from the start logical address to the end logical address the logical address designated by the host device 200 corresponds, acquires the writing type corresponding to the range where the logical address designated by the host device 200 corresponds, and updates the value of the degradation level of the degradation level table 113 corresponding to the write destination physical block determined at the processing 601 according to the acquired writing type.

For example, if the logical address designated by the host device 200 is "0001h", the control unit 108 obtains binary writing as the writing type of the area containing the logical address "0001h". Accordingly, the control unit 108 adds "1" to the value of the degradation level corresponding to the physical block address "1FFFh" of the degradation level table 113.

FIG. 7 shows an example of the state of the updated degradation level table 113. As shown in FIG. 7, with the value of the degradation level corresponding to the physical block address "1FFFh" of the degradation level table 113, "1" has been added to the previous value "00000010h", and becomes "00000011h". Note that the additional amount (amount of stress) of the degradation level corresponding to the writing type will be explained later.

The processing 603 is now explained. The control unit 108 writes the data from the host device 200. Specifically, the control unit 108 refers to the area definition table 112 based on the logical address designated by the host device 200, acquires the corresponding writing type, uses the acquired writing type to transfer the write data sent from the host device 200 to the flash memory unit 103, and writes such data in the write destination physical block address; for example, "1FFFh" determined at the processing 601.

Here, if the write data from the host device 200 is less than a physical block unit, the control unit 108 uses the data previously written in the flash memory unit 103 to create data of a physical block unit, and writes this data in the flash memory unit 103. This kind of processing is required since data can only be rewritten in data erase units of the flash memory unit 103. Accordingly, in this embodiment, the amounts of information recorded in the memory cells are the same bit count in units of physical blocks as the data erase unit.

The processing 604 is now explained. The control unit 108 updates the address conversion table 109 and the invalid block table 110. Specifically, the control unit 108 updates the address conversion table 109 and the invalid block table 110 by exchanging the physical block address of the address conversion table 109 corresponding to the logical block address as the logical address designated by the host device 200, and the physical block address of the invalid block table 110 as the physical address selected at the processing 601 and to which the write data from the host device 200 was written at the processing 603.

FIG. 8 shows an example of the state of the updated address conversion table 109, and FIG. 9 shows an example of the state of the updated invalid block table 110. As shown in FIG. 8 and FIG. 9, the control unit 108 exchanges the physical block address "0010h" corresponding to the logical block address "0001h" designated by the host device 200 and the physical block address "1FFFh" selected at the processing 601, and the logical block address of the address conversion table 109 becomes "1FFFh", and, in the invalid block table 110, "1FFFh" is deleted and "0010h" is newly added.

FIG. 10 shows which table was referred to and updated in the respective processes of the flowchart shown in FIG. 6. Note that, in FIG. 10, "R" shows that the table was referred to and "W" shows that the table was updated.

As shown in FIG. 10, the invalid block table 110 and the degradation level table 113 are referred to in the processing 601, the area definition table 112 is referred to and the degradation level table 113 is updated in the processing 602, the area definition table 112 is referred to and the address conversion table 109 is referred to as needed in the processing 603, and the address conversion table 109 is referred to and the address conversion table 109 and the invalid block table 110 are updated in the processing 604.

4. Calculation of Degradation Level

The additional value in the respective writing types upon updating the degradation level of the degradation level table 113 is now explained. In order to determine the additional value, it is necessary to evaluate the characteristics of the flash memory unit 103 used in the memory card 101. In other words, the additional value will differ depending on the characteristics of the flash memory unit 103 used in the memory card 101. For example, the data retention characteristics of the flash memory unit 103 will differ depending on the process rule or the flash memory manufacture that manufactured the flash memory unit 103, and will also differ depending on whether it is binary writing or multi-valued writing, and whether the multi-valued writing is four-valued, eight-valued or sixteen-valued writing.

Figure 11:
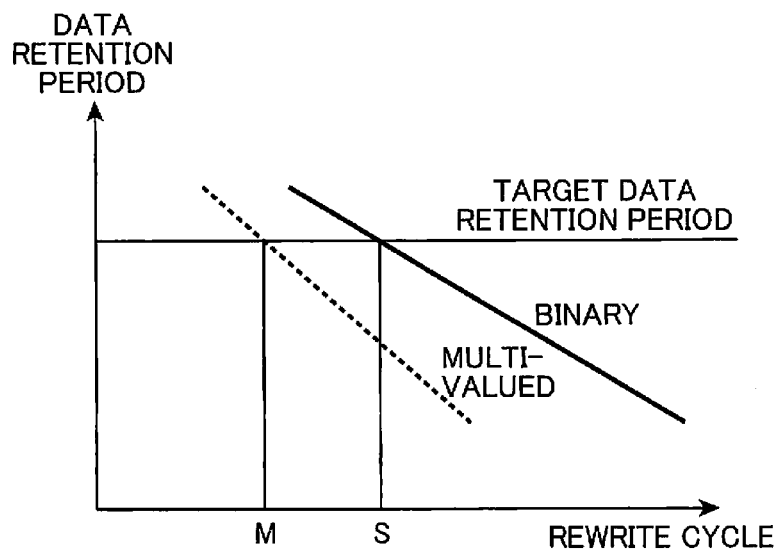
FIG. 11 is a diagram showing the relationship of the rewrite cycle and data retention period of the flash memory unit of the memory card depicted in FIG. 1.
Figure 12:
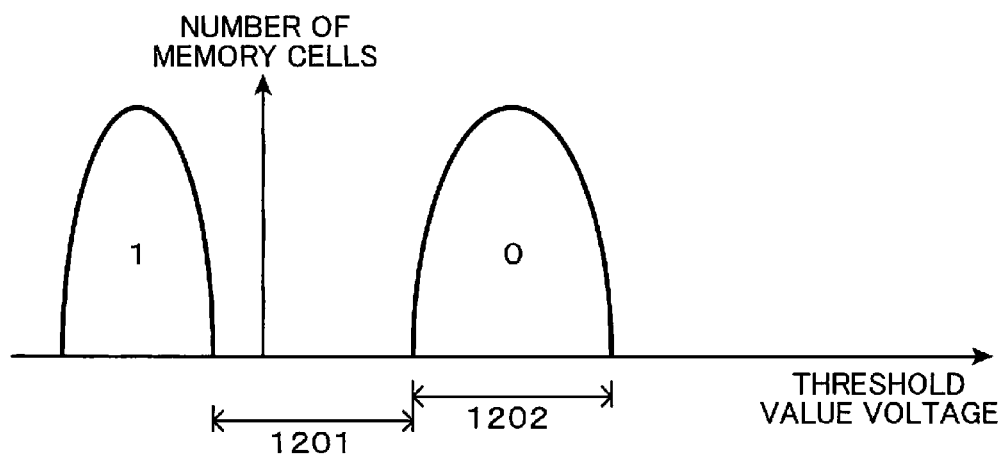
FIG. 12 is a diagram showing the distribution of the threshold voltage of memory cells in the case of binary writing.
Figure 13:
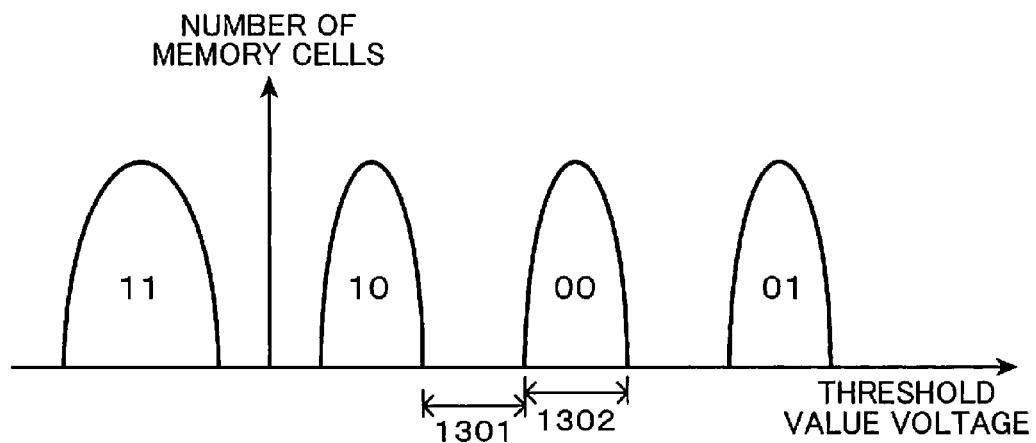
FIG. 13 is a diagram showing the distribution of the threshold voltage of memory cells in the case of four-valued writing.
Figure 14:
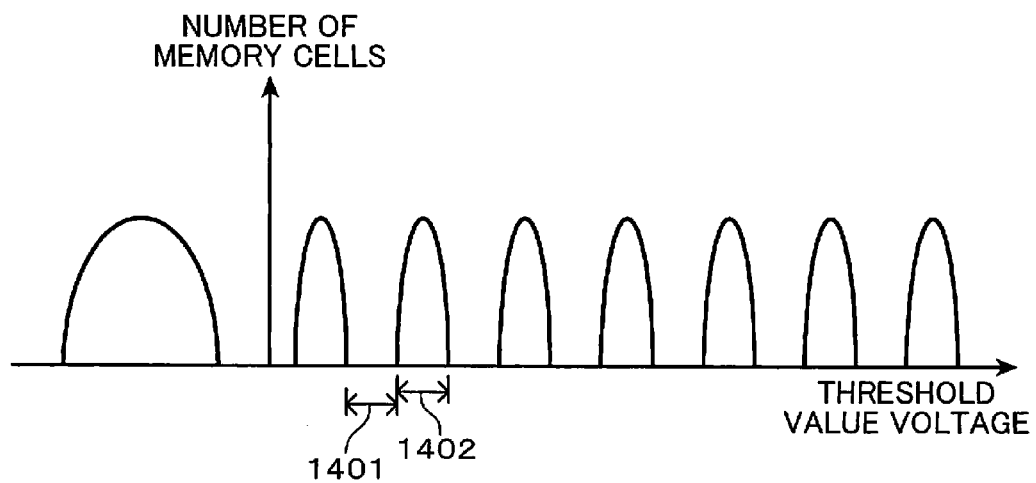
FIG. 14 is a diagram showing the distribution of the threshold voltage of memory cells in the case of eight-valued writing.

FIG. 11 is a diagram showing the relationship of the rewrite cycle and the data retention period of the flash memory unit 103. In FIG. 11, the horizontal axis is the rewrite cycle and the vertical axis is the data retention period, and the rewrite cycle shows a common rewrite cycle regardless of whether it is binary or multi-valued. Moreover, as the evaluation result of the flash memory unit 103, a case of only performing binary rewriting based on binary writing is shown with a solid line, and the case of only performing multi-valued rewriting based on multi-valued writing is shown with a broken line.

In other words, by plotting the data retention period after performing rewriting 10 times, 100 times, 1000 times and 5000 times based on binary writing, and a solid line showing the line of binary rewriting can be drawn, and by plotting the data retention period after performing rewriting 10 times, 100 times, 1000 times and 5000 times based on multi-valued writing, a broken line showing the line of multi-valued rewriting can be drawn. Moreover, regardless of whether the writing type is binary writing or multi-valued writing, the data retention period shall be the period required for a bit error to reach a predetermined bit count upon leaving the flash memory of the flash memory unit 103 after writing data with a common writing method. The evaluation of the data retention period is generally performed with the accelerated durability test that is conducted under a high temperature environment.

As shown in FIG. 11, a predetermined target data retention period is set as the target of the memory card 101. Subsequently, the rewrite cycle ratio where the binary rewriting line and the multi-valued rewriting line respectively interest with the target data retention period is obtained. For example, let it be assumed that the rewrite cycle S based on binary writing is approximately triple the rewrite cycle M based on multi-valued writing. The binary rewrite degradation and the multi-valued rewrite degradation in the foregoing case are set with a simple integer ratio of the inverse of the rewrite cycle, and the additional value is determined based on the ratio of the binary rewrite degradation and the multi-valued rewrite degradation. Specifically, binary rewrite degradation: multi-valued rewrite degradation=1/3:1=1:3, and "1" is obtained as the additional amount upon performing binary writing, and "3" is obtained as the additional amount upon performing multi-valued writing.

Note that the additional amount is not limited to the foregoing examples and may be variously changed, and a different value may be used for each multi-valued writing. For example, an additional amount upon performing four-valued writing may be set and an additional amount upon performing eight-valued writing may be set, respectively. In the foregoing case, preferably, the additional amount upon performing binary writing is set to be smaller than the additional amount upon performing four-valued writing, and the additional amount upon performing four-valued writing is set to be smaller than the additional amount upon performing eight-valued writing.

With the memory card 101 configured as described above, introduced is a scheme of managing, with a common scale, the degradation in binary writing and the degradation in multi-valued writing. Accordingly, it is not necessary to individually set areas for the respective writing types in the memory card 101 capable of binary writing and multi-valued writing, and it is thereby possible to seek the equalization of degradation of the memory card 101 and inhibit the degradation of the memory card 101, as well as effectively use all physical blocks of the memory card 101. Consequently, in the memory card 101 capable of binary writing and multi-valued writing, it is possible to arbitrarily set a binary writing area and a multi-valued writing area and effectively use all blocks of the nonvolatile memory without requiring any physical regional control of the respective areas.

The following is a summary of the present invention based on each of the embodiments described above. Specifically, the nonvolatile memory controller according to the present invention is a nonvolatile memory controller for controlling a nonvolatile memory, wherein the nonvolatile memory includes a plurality of blocks, each of the blocks includes a plurality of memory cells and is an erase unit of data in the nonvolatile memory, each of the memory cells is capable of recording N bit of information (wherein N is an integer of 1 or more), degradation in characteristics of the memory cells differs according to an amount of information that is recorded, and wherein the nonvolatile memory controller includes a control unit for controlling reading, writing and erasure of data to and from the nonvolatile memory, and a stress table for recording a degradation level of the memory cells in the block units, and wherein the control unit records, in the stress table, the degradation level of the memory cells according to the amount of information stored in the memory cells for each cycle of data erasure from the blocks.

With this nonvolatile memory controller, since the degradation level of memory cells is stored in the stress table according to the amount of information stored in the memory cells for each cycle of data erasure from the blocks in blocks units of the nonvolatile memory as the erase unit of data, it is possible to introduce a scheme of managing, with a common scale, the degradation in the case of binary writing and the degradation in the case of multi-valued writing in a nonvolatile storage device capable of performing binary writing and multi-valued writing based on blocks and thereby seek the equalization of degradation of the nonvolatile memory, inhibit the degradation of the nonvolatile memory, and effectively use all blocks of the nonvolatile memory. Consequently, it is possible to arbitrarily provide a binary writing area and a multi-valued writing area and effectively use all blocks of the nonvolatile memory without requiring any physical regional control of the respective areas.

Preferably, the amounts of information recorded in the memory cells are the same bit count in the block units.

In the foregoing case, since the amounts of information recorded in the memory cells are the same bit count in the block units, it is to introduce a scheme of managing, with a common scale, the degradation in the case of binary writing and the degradation in the case of multi-valued writing in a nonvolatile memory which performs the erasure and writing of data in block units.

Preferably, in the writing control, the control unit refers to the stress table and writes data in a block having the memory cells with a low degradation level.

In the foregoing case, since the stress table is referred to and data is written in blocks having the memory cells with a low degradation level in the writing control, all blocks can be used equally.

Preferably, the control unit records the degradation level of the memory cells in the stress table after erasing data from the block and before writing data in the block.

In the foregoing case, since the degradation level of the memory cells is recorded in the stress table after erasing the blocks and after writing data in the blocks, it is possible to reliably record the degradation level of the memory cells in the stress table for each cycle of data erasure from the blocks.

Preferably, the nonvolatile memory controller further comprises an address conversion table for storing, with an address designated from an outside of the nonvolatile memory controller as a logical address and an address of the block of the nonvolatile memory as a physical address, correspondence information of the logical address and the physical address.

In the foregoing case, by using the address conversion table which stores, with an address designated from the outside of the nonvolatile memory controller as a logical address and an address of the block of the nonvolatile memory as a physical address, correspondence information of the logical address and the physical address, it is possible to write data in blocks of the nonvolatile memory with a physical address corresponding to the logical address designated from the outside while managed, with a common scale, the degradation in the case of binary writing and the degradation in the case of multi-valued writing.

Preferably, the nonvolatile memory controller further comprises an area definition table for determining the amount of information to be recorded in the memory cells correspondingly to the logical address.

In the foregoing case, since the area definition table can be used to determine the amount of information to be recorded in the memory cells correspondingly to the logical address designated from the outside of the nonvolatile memory controller, data can be written with the writing method according to the determined amount of information. Consequently, it is possible to arbitrarily provide a binary writing area and a multi-valued writing area and effectively use all blocks of the nonvolatile memory without requiring any physical regional control of the respective areas.

Preferably, the area definition table is capable of being rewritten from an outside of the nonvolatile memory controller.

In the foregoing case, since the contents of the area definition table can be rewritten from the outside of the nonvolatile memory controller, it is possible to arbitrarily provide a binary writing area and a multi-valued writing area and effectively use all blocks of the nonvolatile memory without requiring any physical regional control of the respective areas.

Preferably, the degradation level of the memory cells is determined based on a retention period of data written in the memory cells.

In the foregoing case, since the degradation level of the memory cells is determined based on the retention period of data written in the memory cells, the reliability of data will improve in both the binary writing area and the multi-valued writing area.

The nonvolatile storage device according to the present invention comprises any one of the foregoing nonvolatile memory controllers, and the nonvolatile memory.

Preferably, the nonvolatile memory includes a NAND-type flash memory.

In the foregoing case, since a NAND-type flash memory is used, it is possible to provide a nonvolatile storage device with a large capacity and of a low bit cost, as well as improve the reliability of data.

Since the present invention is able to equalize the degradation of all physical blocks in a nonvolatile storage device storing data based on different writing methods according to the writing type and consequently provide a nonvolatile storage device with high user-friendliness capable of effectively improving the reliability of data, the present invention is useful as a nonvolatile storage device using a nonvolatile memory and a nonvolatile memory controller for controlling the nonvolatile memory.

This application is based on Japanese patent application serial no. 2010-069602, filed in Japan Patent Office on Mar. 25, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A nonvolatile memory controller for controlling a nonvolatile memory,
   wherein the nonvolatile memory includes a plurality of blocks,
   each of the plurality of blocks includes a plurality of memory cells and is an erase unit for data in the nonvolatile memory,
   each of the plurality of memory cells records 1 bit, or 2, 3, or 4 bits of information,
   degradation in characteristics of the plurality of memory cells differs according to an amount of information that is recorded,
   and wherein the nonvolatile memory controller includes:
   a control unit for controlling reading, writing and erasure of data to and from the nonvolatile memory; and
   a stress table for recording a degradation level of the plurality of memory cells in block units,
   wherein the control unit records, in the stress table, the degradation level of the plurality of memory cells according to a bit count of information stored in the plurality of memory cells for each cycle of data erasure from the plurality of blocks by adding an additional value to a value of a previous degradation level stored in the stress table, and
   wherein the additional value of a plurality of memory cells that records 1 bit of information is lower than the additional value of memory cells that record 2, 3 or 4 bits of information.

2. The nonvolatile memory controller according to claim 1, wherein amounts of information recorded in the plurality of memory cells have a same bit count in the plurality of block units.

3. The nonvolatile memory controller according to claim 1, wherein the control unit refers to the stress table and writes data in a block having the plurality of memory cells with a low degradation level when performing writing control of data to the nonvolatile memory.

4. The nonvolatile memory controller according to claim 1, wherein the control unit records the degradation level of the plurality of memory cells in the stress table after erasing data from a block and before writing data in a block.

5. The nonvolatile memory controller according to claim 1, further comprising:
   an address conversion table for storing, with an address designated from outside of the nonvolatile memory controller as a logical address and an address of the block of the nonvolatile memory as a physical address, correspondence information of the logical address and the physical address.

6. The nonvolatile memory controller according to claim 5, further comprising:
   an area definition table for determining the amount of information to be recorded in the plurality of memory cells corresponding to the logical address.

7. The nonvolatile memory controller according to claim 6, wherein the area definition table is capable of being rewritten from outside of the nonvolatile memory controller.

8. The nonvolatile memory controller according to claim 1, wherein the degradation level of the plurality of memory cells is determined based on a retention period of data written in the plurality of memory cells.

9. A nonvolatile storage device comprising:
   the nonvolatile memory controller according to claim 1; and
   the nonvolatile memory.

10. The nonvolatile storage device according to claim 9, wherein the nonvolatile memory includes a NAND-type flash memory.

* * * * *